(12) United States Patent
Zhu

(10) Patent No.: US 11,397,128 B2
(45) Date of Patent: Jul. 26, 2022

(54) LEVEL CORRECTION SYSTEM

(71) Applicant: TRIPLE WIN TECHNOLOGY(SHENZHEN) CO. LTD., Shenzhen (CN)

(72) Inventor: Cong Zhu, Shenzhen (CN)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 47 days.

(21) Appl. No.: 17/118,954

(22) Filed: Dec. 11, 2020

(65) Prior Publication Data
US 2022/0136928 A1 May 5, 2022

(30) Foreign Application Priority Data
Nov. 5, 2020 (CN) .......................... 202011226157.8

(51) Int. Cl.
*G01B 11/27* (2006.01)
*G01M 11/04* (2006.01)
*G01M 11/02* (2006.01)

(52) U.S. Cl.
CPC .......... *G01M 11/04* (2013.01); *G01B 11/272* (2013.01); *G01M 11/0214* (2013.01); *G01M 11/0228* (2013.01)

(58) Field of Classification Search
CPC ............. G01M 11/04; G01M 11/0214; G01M 11/0228; G01B 11/272

USPC ........................................ 356/124–127, 400
See application file for complete search history.

(56) References Cited

U.S. PATENT DOCUMENTS

| | | | | |
|---|---|---|---|---|
| 5,768,035 | A * | 6/1998 | Grassens | G11B 7/22 359/822 |
| 6,525,810 | B1 * | 2/2003 | Kipman | G01N 21/88 356/237.1 |
| 6,987,561 | B2 * | 1/2006 | Reznichenko | G01M 11/005 356/237.2 |
| 8,422,006 | B2 * | 4/2013 | Wu | G01M 11/0221 356/135 |
| 9,645,043 | B2 * | 5/2017 | Allione | G01M 11/0285 |
| 2015/0260507 | A1 * | 9/2015 | Aramaki | G01B 11/24 356/612 |

* cited by examiner

*Primary Examiner* — Isiaka O Akanbi
(74) *Attorney, Agent, or Firm* — ScienBiziP, P.C.

(57) ABSTRACT

A level correction system includes a first adjustment device, a chuck device provided on the first adjustment device, a first reflective device provided on the chuck device, a second adjustment device, a carrying table provided on the second adjustment device, a second reflective device provided on the carrying table, a laser emitter configured to emit incident laser light, a laser receiver, and a controller. The first reflective device and the second reflective device are used to reflect the incident laser light to form a reflected laser light. The laser receiver is used to receive the reflected laser light. The controller is used to determine a height of the chuck device or the carrying table and whether a center point of a reflected light spot formed by the reflected laser light is offset from a center point of an incident light spot formed by the incident laser light.

15 Claims, 7 Drawing Sheets

LEVEL CORRECTION SYSTEM

FIELD

The subject matter herein generally relates to a level correction system for calibrating an absolute level of a device.

BACKGROUND

A lens testing machine is used for testing and assembly of a lens. The lens testing machine mainly includes an AA chuck and a carrying table. When the lens is assembled and tested, the lens is clamped on the AA chuck, and a camera that captures reflected light is placed on the carrying table. A level of the AA chuck and the carrying table need to be calibrated in advance to ensure that planes where the carrying table and the AA chuck are located are parallel, and a height of the AA chuck and the carrying table also need to be calibrated in advance. Currently, a calibration process of the AA chuck and the carrying table is cumbersome, efficiency is low, and a calibration accuracy is low.

BRIEF DESCRIPTION OF THE DRAWINGS

Implementations of the present disclosure will now be described, by way of embodiments, with reference to the attached figures.

DETAILED DESCRIPTION

Figure 1:
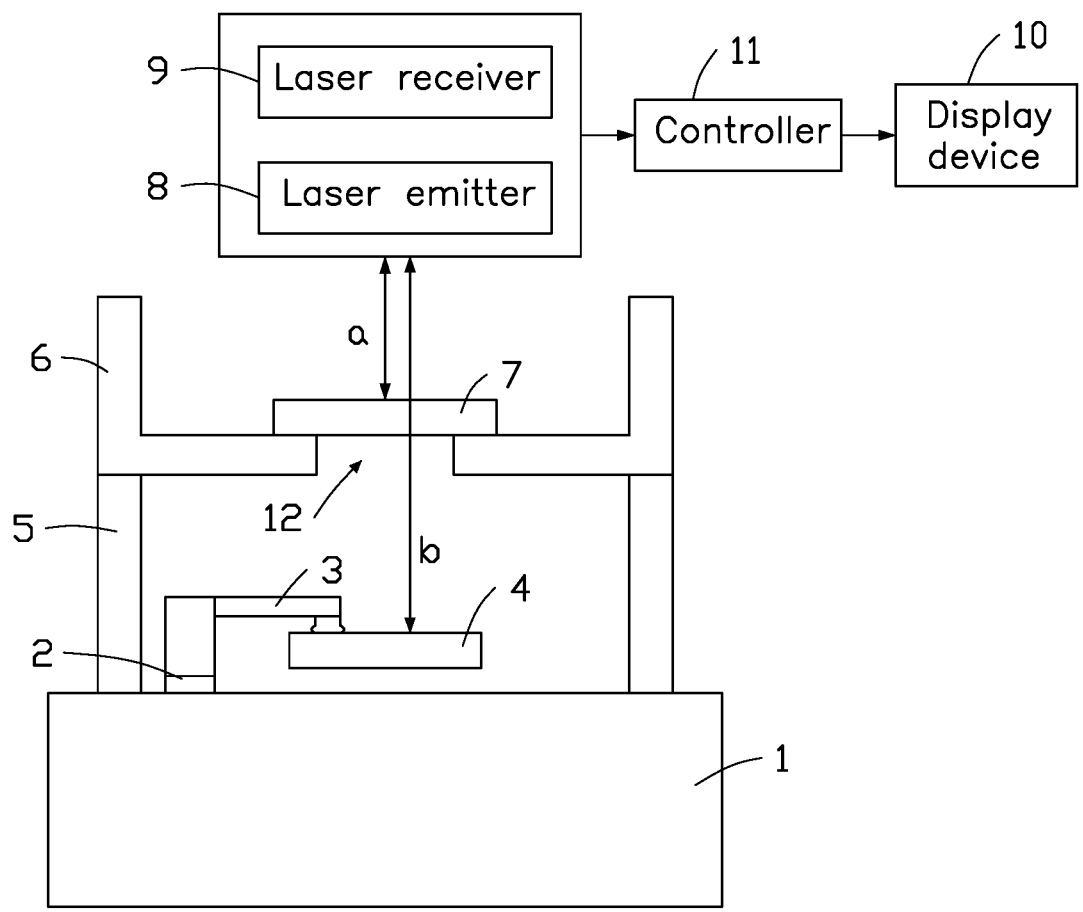
FIG. 1 is a schematic structural diagram of an embodiment of a level correction system.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or another word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series, and the like.

FIG. 1 shows an embodiment of a level correction system 100 used for correction of a lens testing machine. The level correction system 100 includes a platform 1, a first adjustment device 2 provided on the platform 1, a chuck device 3 provided on the first adjustment device 2, a first reflective device 4 provided on the chuck device 3, a second adjustment device 5 provided on the platform 1, a carrying table 6 provided on the second adjustment device 5, a second reflective device 7 detachably provided on the carrying table 6, a laser emitter 8, a laser receiver 9, and a controller 11. The laser emitter 8, the laser receiver 9, and the controller 11 are arranged above the carrying table 6. The controller 11 is electrically coupled to the first adjustment device 2, the second adjustment device 5, the laser emitter 8, and the laser receiver 9.

When the lens testing machine is in use, a lens is clamped on the chuck device 3, and a camera that collects reflected light is placed on the carrying table 6. In order to improve a yield of the assembled lens, a level and height of the chuck device 3 and the carrying table 6 need to be calibrated in advance.

The laser emitter 8 is used to emit incident laser light.

The first reflective device 4 and the second reflective device 7 are both used to reflect the incident laser light to form a reflected laser light.

The laser receiver 9 is used to receive the reflected laser light.

The controller 11 is used to determine the height of the chuck device 3 or the carrying platform 6 and simultaneously determine whether a center point of a light spot formed by the reflected laser light is offset relative to a center point of a light spot formed by the incident light. If the center point of the light spot of the reflected light is offset from the center point of the light spot of the incident light, the first adjustment device 2 or the second adjustment device 5 is adjusted to adjust the level of the chuck device 3 or the carrying table 6 to align the center point of the light spot of the reflected light with the center point of the light spot of the incident light.

Referring to FIG. 1, the chuck device 3 is located directly below the carrying platform 6, and the carrying platform 6 defines a through hole 12 corresponding to the chuck device 3 so that the chuck device 3 can be observed through the through hole 12. The second reflective device 7 is arranged at the through hole 12, and the first reflective device 4 is arranged directly below the second reflective device 7.

Figure 2:
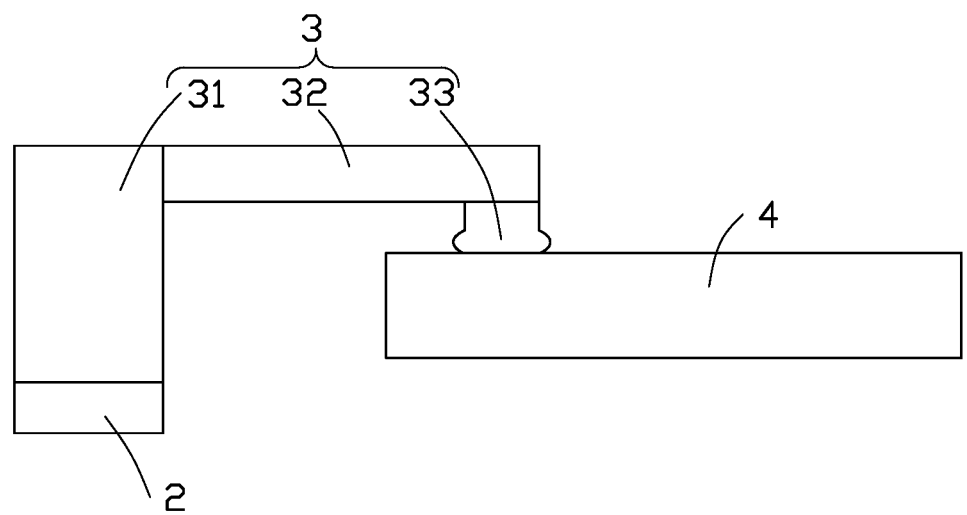
FIG. 2 is a schematic structural diagram of a chuck device in the level correction system.
Figure 3:
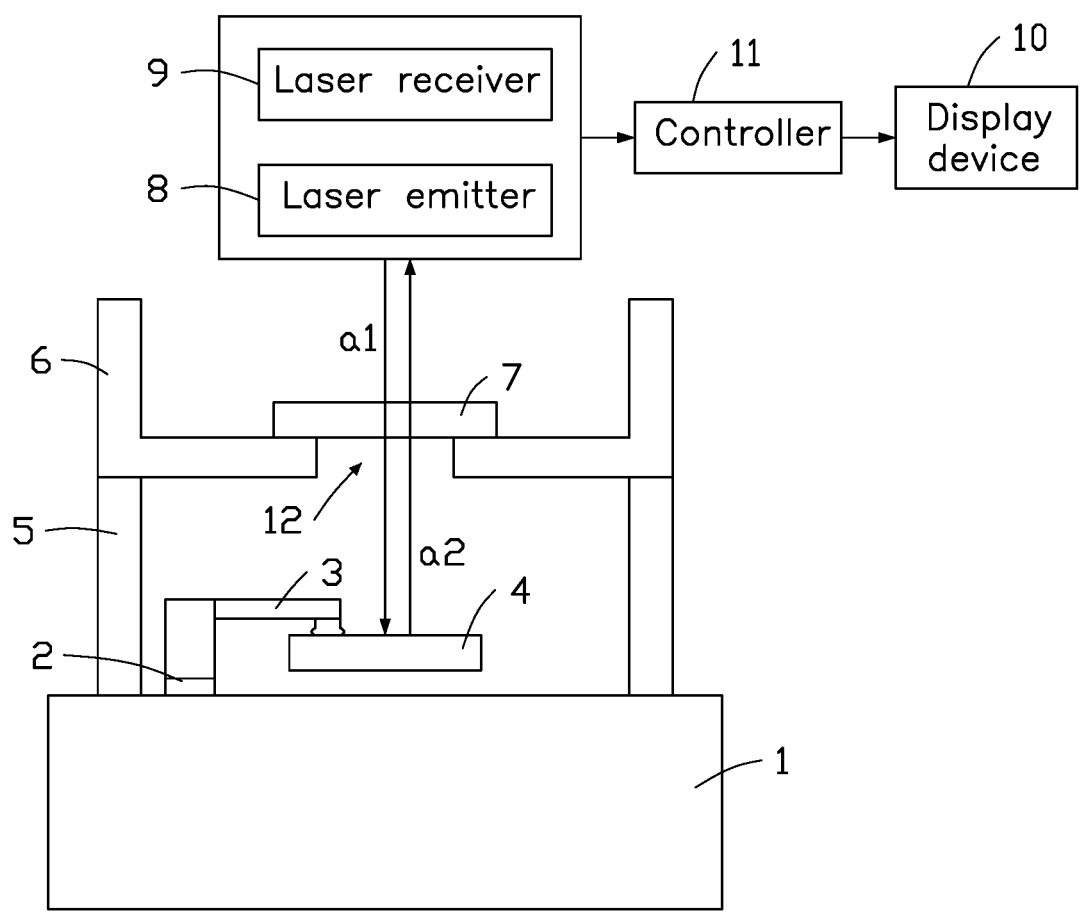
FIG. 3 is a diagram of a laser light during a level calibration of the chuck device.

Referring to FIG. 2, the chuck device 3 includes a chuck seat 31, a chuck arm 32 arranged on the chuck seat 31, and a chuck 33 arranged on an end of the chuck arm 32 away from the chuck seat 31. The first adjustment device 2 is arranged on a bottom of the chuck seat 31 and used to adjust a height of the chuck seat 31, thereby adjusting the level of the chuck 33.

The first adjustment device 2 includes a first driving mechanism (not shown) and a fine adjustment column (not shown). The first driving mechanism is electrically coupled to the controller 11, and under the control of the controller 11, the first driving mechanism drives the fine adjustment column to move up and down, thereby finely adjusting the height of two ends of the chuck seat 31 and adjusting the level of the chuck 33.

In one embodiment, there are three first adjustment devices 2. Two of the first adjustment devices 2 are respectively arranged at the two ends of the chuck seat 31 for adjusting the level of the chuck device 3. The first adjustment device 2 moves up and down to adjust the height of the two ends of the chuck seat 31 in order to adjust the level of the chuck 33 to keep the chuck 33 level. The third first adjustment device 2 is arranged on a top portion of the chuck seat 31 to adjust a height of the chuck device 3 so that a distance between the chuck device 3 and the carrying platform 6 is adjusted to a required height.

In another embodiment, the first adjustment device 2 may be an adjusting nut, and the level and height of the chuck device 3 can be adjusted by manually adjusting the adjusting nut.

Referring to FIG. 1, the carrying platform 6 has a substantially rectangular cross-sectional structure. The through hole 12 is a substantially circular hole provided in a middle of the carrying platform 6. The second adjustment device 5 is arranged at a bottom of the carrying platform 6. The second adjustment device 5 includes a second driving mechanism (not shown) and a lifting column (not shown). The carrying table 6 is arranged at a top end of the lifting column, and the second driving mechanism is electrically coupled to the controller 11. The second driving mechanism is used to drive the lifting column up and down under the control of the controller 11 to adjust a height of different parts of the carrying platform 6 to keep the entire carrying platform 6 level.

Specifically, in one embodiment, there are at least three second adjustment devices 5. The three second adjustment devices 5 are arranged at the bottom of three corners of the carrying platform 6. The three corners constitute a plane, and the carrying platform 6 can be adjusted to be level by controlling the second adjustment devices 5 at the three corners.

In another embodiment, the second adjustment device 5 may be an adjusting nut, and the level and height of the carrying platform 6 can be adjusted by manually adjusting the adjusting nut.

Referring to FIG. 1, the laser emitter 8 is arranged directly above the second reflective device 7, and the incident laser light emitted by the laser emitter 8 is incident on the first reflective device 4 or the second reflective device 7 and then reflected by the first reflective device 4 or the second reflective device 7 to form the reflected laser light.

Figure 4:
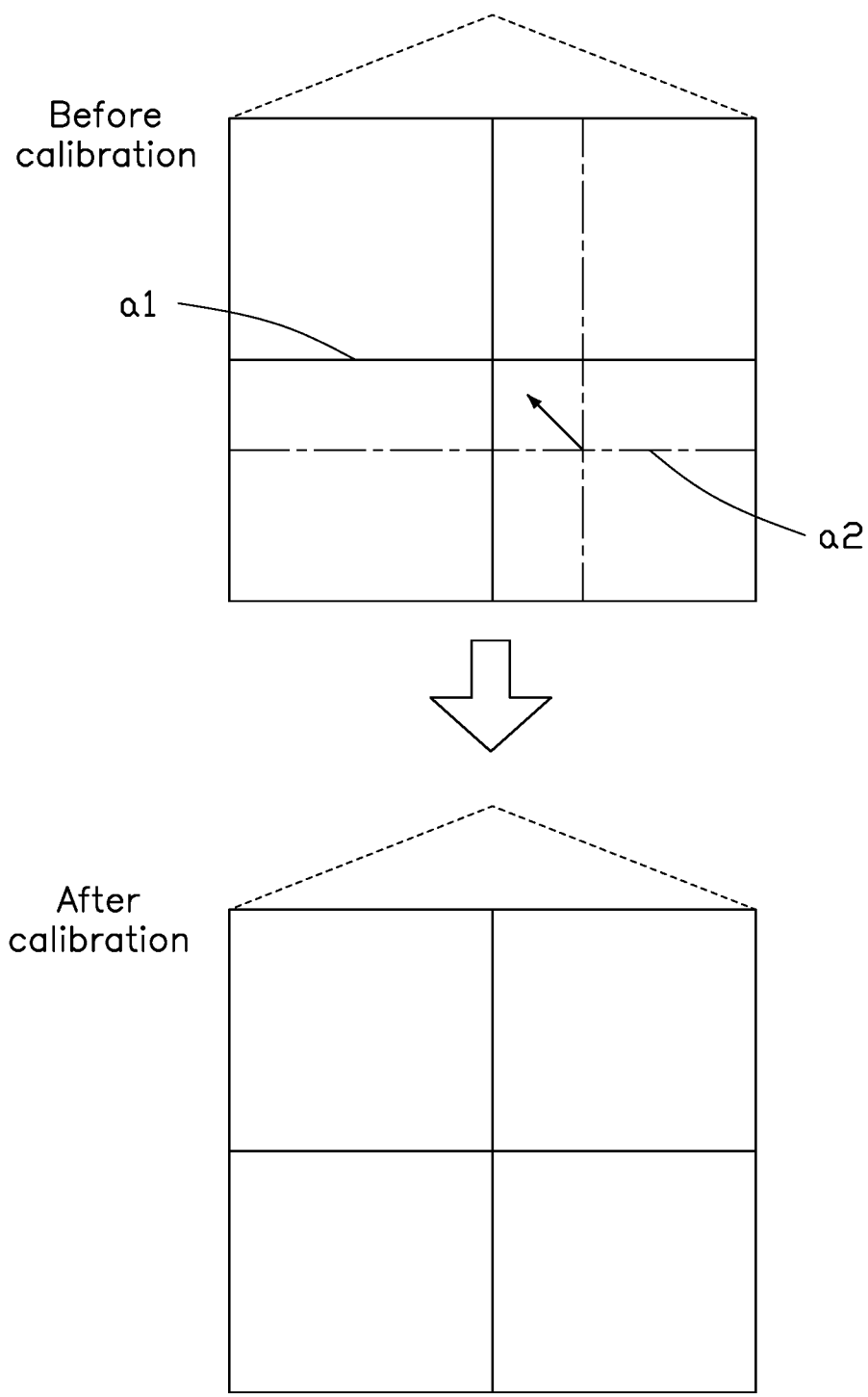
FIG. 4 is a diagram showing a light spot calibration process during a level calibration of the chuck device.
Figure 5:
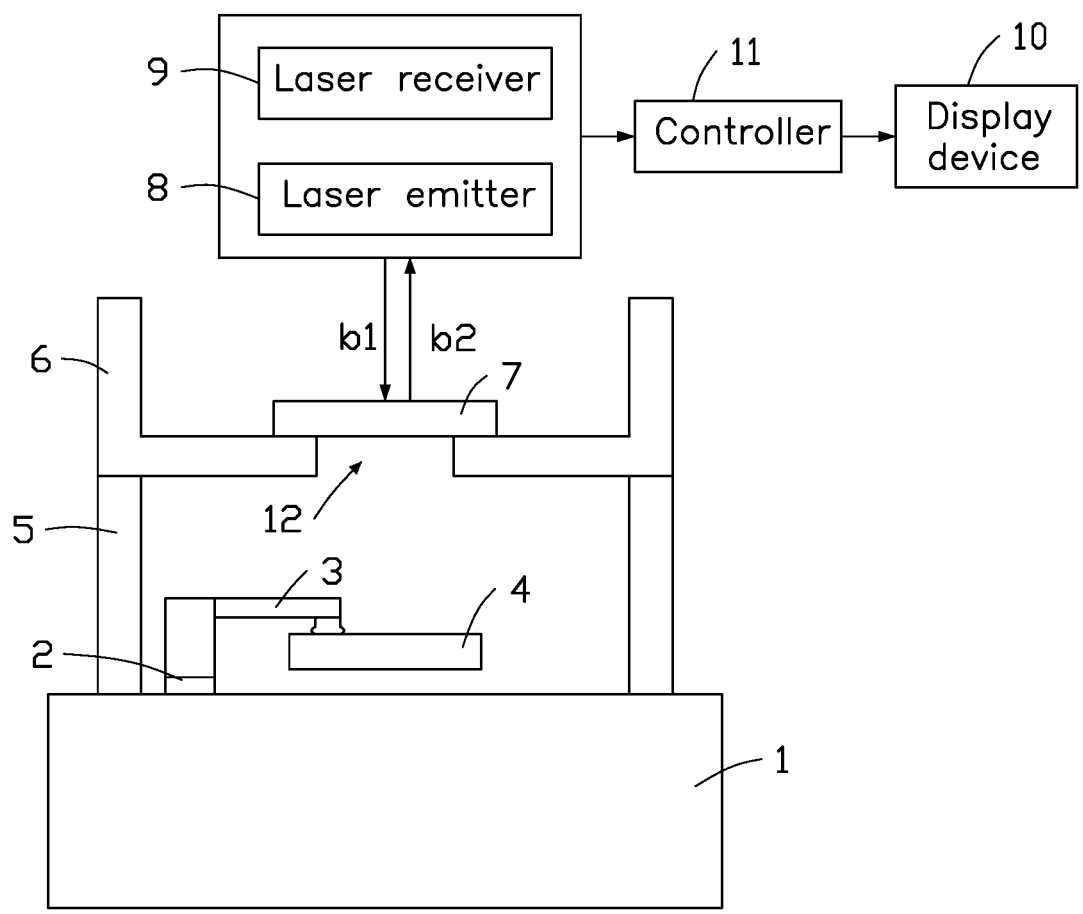
FIG. 5 is a diagram of a laser light during a level calibration of the carrying table.
Figure 6:
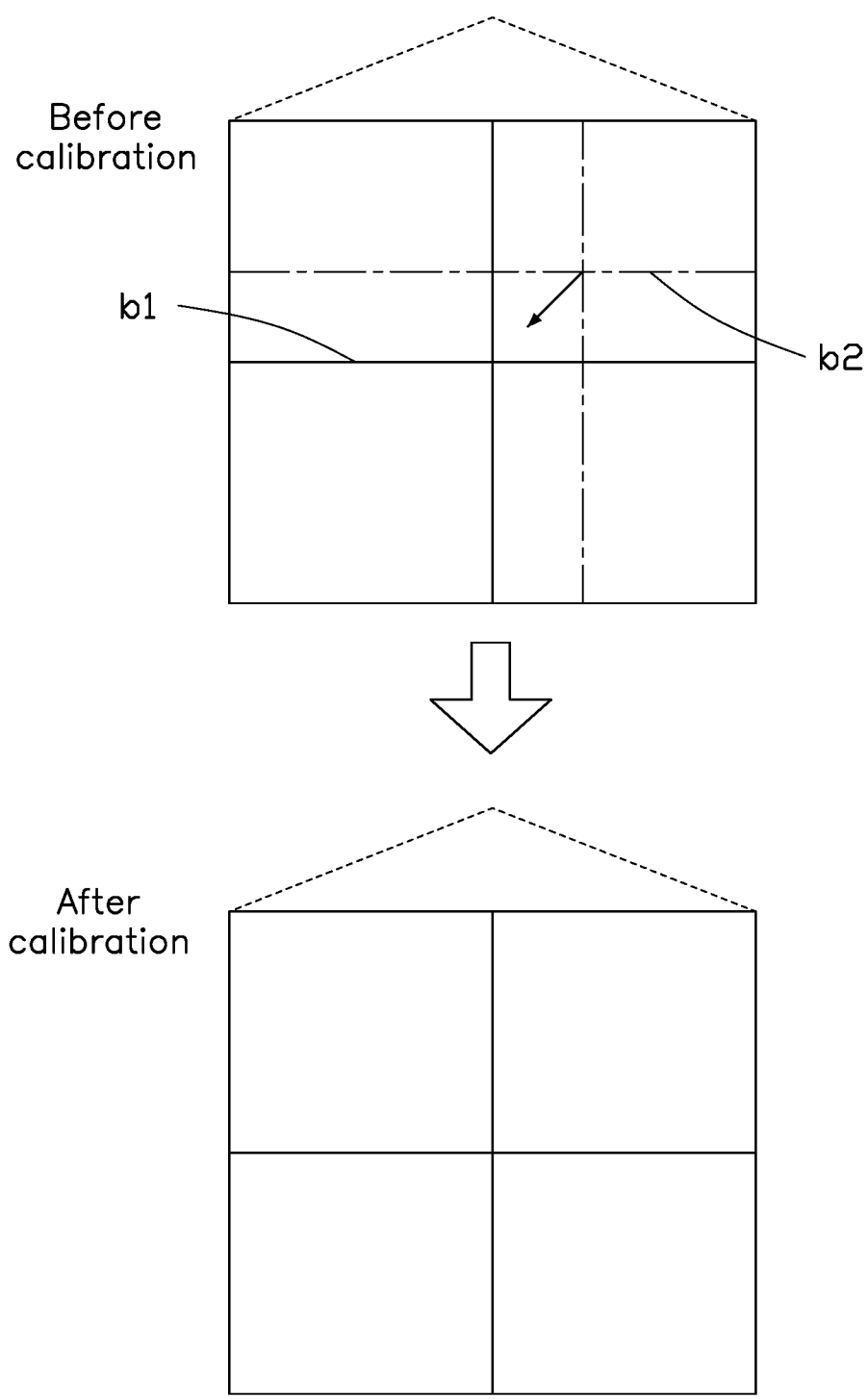
FIG. 6 is a diagram showing a light spot calibration process during a level calibration of the carrying table.

Referring to FIG. 4, in one embodiment, the level correction system 100 further includes a laser processing software. The laser emitter 8 can simultaneously transmit the emitted incident laser light to the laser processing software for processing. The laser processing software can process the incident laser light into an incident light spot. The controller 11 obtains the incident light spot, and the incident light spot is a cross-shaped light spot.

In one embodiment, the laser emitter 8 is a vertical cavity surface emitting laser, which can simultaneously measure the level of the first reflective device 4 or the second reflective device 7.

Referring to FIG. 1, the laser receiver 9 receives the reflected laser light and transmits the reflected laser light to the laser processing software. The laser processing software can process the reflected laser light into a reflected light spot. The controller 11 obtains the reflected light spot, and the reflected light spot is also a cross-shaped light spot.

In one embodiment, the incident light spot and the reflected light spot are of different colors. Specifically, the incident light spot is red, and the reflected light spot is blue, which is convenient to manually observe and distinguish.

After the controller 11 obtains the incident light spot and the reflected light spot, the controller 11 determines the height of the chuck device 3 or the carrying platform 6 and further determines whether the reflected light spot is offset relative to the incident light spot. If the reflected light spot is offset, the first adjustment device 2 or the second adjustment device 5 is adjusted to make the reflected light spot align with the incident light spot. When the reflected light spot aligns with the incident light spot, the chuck device 3 or the carrying table 6 is level, and the chuck device 3 and the carrier 6 do not need to be leveled.

In one embodiment, adjustment of the first adjustment device 2 and the second adjustment device 5 may be controlled by the controller 11 to realize automatic adjustment. In other embodiments, the first adjustment device 2 and the second adjustment device 5 may be adjusted manually.

In one embodiment, the level correction system 100 further includes a display device 10, which is electrically coupled to the controller 11 and can display the incident light spot and the reflected light spot, so that the incident light spot, the reflected light spot, and a correction process of the incident light spot and the reflected light spot can be manually observed.

In one embodiment, the level correction system 100 can communicate with a client terminal. After each calibration is completed, the controller 11 uploads a serial number of a calibrated lens test platform, calibration process data, and corresponding pictures to the client terminal for subsequent viewing.

Referring to FIGS. 3-7, the incident laser light includes a first incident laser light a1 and a second incident laser light b1. The first incident laser light a1 passes through the second reflective device 7 and is reflected by the first reflective device 4 to form a first reflected laser light a2. The second incident laser light b1 is reflected by the second reflective device 7 to form a second reflected laser light b2. According to whether the first incident laser light a1 and the second incident laser light b1 are emitted at the same time, the above-mentioned correction process may have the following two situations.

Referring to FIGS. 3-6, when the laser emitter 8 emits the first incident laser light a1 and the second incident laser light b1, the chuck device 3 and the carrying table 6 are respectively calibrated as described below in the following steps.

In a first step, the laser emitter 8 emits the first incident laser light a1. The first incident laser light a1 is incident on the first reflective device 4, and the laser emitter 8 transmits the first incident laser light a1 to the laser processing software. The laser processing software converts the first incident laser light a1 into a first incident light spot a3, and the controller 11 obtains the first incident light spot a3 and displays the first incident light spot a3 on the display device 10.

In a second step, the first reflective device 4 reflects the first incident laser light a1 to form the first reflected laser light a2, and the first reflected laser light a2 enters the laser receiver 9.

In a third step, the laser receiver 9 obtains the first reflected laser light a2, the first reflected laser light a2 is converted into a first reflected light spot a4 by the laser software, and the controller 11 obtains the first reflected light spot a4.

In a fourth step, after the controller 11 obtains the first incident light spot a3 and the first reflected light spot a4, the controller 11 determines whether the first reflected light spot a4 is offset relative to the first incident light spot a3.

In a fifth step, if the first reflected light spot a4 is offset relative to the first incident light spot a3, the first adjustment device 2 is adjusted so that the cross-shaped first reflected light spot a4 is moved to align with the cross-shaped first incident light spot a3, so that the chuck device 3 is leveled.

In a sixth step, the laser emitter 8 emits the second incident laser light b1. The second incident laser light b1 is incident on the second reflective device 7, and the laser emitter 8 transmits the second incident laser light b1 to the laser processing software. The laser processing software converts the second incident laser light b1 into a second incident light spot b3, and the controller 11 obtains the second incident light spot b3 and displays the second incident light spot b3 on the display device 10.

In a seventh step, the second reflective device 7 reflects the second incident laser light b1 to form the second reflected laser light b2, and the second reflected laser light b2 enters the laser receiver 9.

In an eighth step, the laser receiver 9 obtains the second reflected laser light b2 and transmits the second reflected laser light b2 to the laser processing software. The laser processing software converts the second reflected laser light b2 into a second reflected light spot b4, and the controller 11 obtains the second reflected light spot b4.

In a ninth step, the controller 11 obtains the second incident light spot b3 and the second reflected light spot b4 and determines whether the second reflected light spot b4 is offset relative to the second incident light spot b3.

In a tenth step, if the second reflected light spot b4 is offset relative to the second incident light spot b3, the second adjustment device 5 is adjusted so that the cross-shaped second reflected light spot b4 is moved to align with the cross-shaped second incident light spot b3, so that the carrying table 6 is leveled.

The first through fifth steps for leveling the chuck device 3 and the sixth through tenth steps for leveling the carrying table 6 are in no particular order.

In one embodiment, when the chuck device 3 needs to be calibrated, the first reflective device 4 is placed on the chuck device 3 and removed after the calibration is completed. When the carrying platform 6 needs to be calibrated, the second reflective device 7 is placed on the carrying platform 6 and removed after the calibration is completed. The first reflective device 4 and the second reflective device 7 may be two different mirrors or may be the same mirror.

Figure 7:
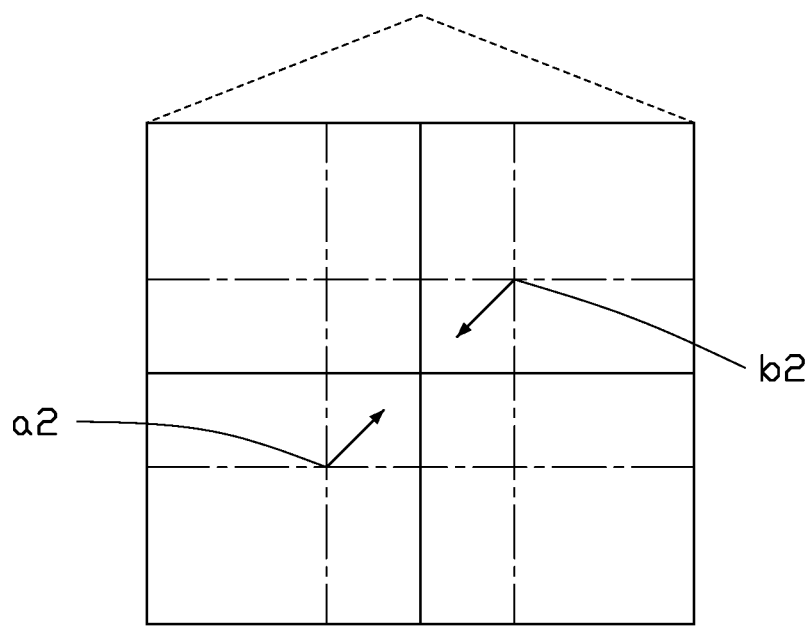
FIG. 7 is a diagram showing a light spot calibration process during a level calibration of the chuck device and the carrying table at the same time.

Referring to FIG. 7 in combination with FIG. 1, when the laser emitter 8 emits the first incident laser light a1 and the second incident laser light b1 at the same time, the chuck device 3 and the carrying table 6 are simultaneously calibrated. That is, the leveling of the chuck device 3 in the first through fifth steps and the leveling of the carrying table in the sixth through tenth steps are performed simultaneously, so that a leveling efficiency is higher. In this situation, the first incident laser light a1 and the second incident laser light b1 are two different lasers. The first reflective device 4 can reflect the first incident laser light a1 while transmitting the second incident laser light b1, and the second reflective device 7 can reflect the second incident laser light b1.

The level correction system 100 is also applicable to other calibration instruments for calibrating the absolute level of the instruments, and can also be used with a calculator system to measure the height of the chuck device and the carrying platform.

Compared with the related art, the level correction system 100 can quickly and accurately perform automatic leveling calibrations on multiple planes such as the chuck device and the carrying table on the lens testing machine, and the leveling calibration is fast and has a high accuracy within 0.01°. The calibration system is lightweight and easy to move and use, and has a wide range of applications. Furthermore, the calibration data can be automatically uploaded to the client terminal for follow-up review.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A level correction system comprising:
  a platform;
  a first adjustment device provided on the platform;
  a chuck device provided on the first adjustment device;
  a first reflective device detachably provided on the chuck device;
  a second adjustment device provided on the platform;
  a carrying table provided on the second adjustment device;
  a second reflective device detachably provided on the carrying table;
  a laser emitter configured to emit incident laser light;
  a laser receiver; and
  a controller electrically coupled to the laser emitter and the laser receiver; wherein:
  both the first reflective device and the second reflective device are used to reflect the incident laser light to form a reflected laser light;
  the laser receiver is used to receive the reflected laser light;
  the controller is used to determine a height of the chuck device or the carrying table, and at the same time determine whether a center point of a reflected light spot formed by the reflected laser light is offset from a center point of an incident light spot formed by the incident laser light.

2. The level correction system of claim 1, wherein:
  if the center point of the reflected light spot is offset from the center point of the incident light spot, the controller adjusts the first adjustment device or the second adjustment device to adjust a level of the chuck device or the carrying platform so that the center point of the reflected light spot is aligned with the center point of the incident light spot.

3. The level correction system of claim 1, wherein:
  the carrying table is located above the chuck device;
  the carrying table defines a through hole;
  the second reflective device is arranged at the through hole; and
  the first reflective device is arranged below the through hole.

4. The level correction system of claim 3, wherein:
  the incident laser light comprises a first incident laser light and a second incident laser light;

the first incident laser light passes through the second reflective device and is reflected by the first reflective device; and the second incident laser light is reflected by the second reflective device.

5. The level correction system of claim 1, wherein:
there are at least three second adjustment devices arranged at a bottom of the carrying platform.

6. The level correction system of claim 1, wherein:
the incident light spot and the reflected light spot are both cross-shaped.

7. The level correction system of claim 1, further comprising a display device electrically coupled to the controller.

8. The level correction system of claim 1, wherein the first adjustment device and the second adjustment device are both adjusting nuts.

9. A level correction system comprising:
a platform;
a first adjustment device provided on the platform;
a chuck device provided on the first adjustment device;
a first reflective device detachably provided on the chuck device;
a second adjustment device provided on the platform;
a carrying table provided on the second adjustment device;
a second reflective device detachably provided on the carrying table;
a laser emitter configured to emit a first incident laser light and a second incident laser light;
a laser receiver configured to receive a first reflected laser light and a second reflected laser light; and
a controller electrically coupled to the laser emitter and the laser receiver; wherein:
the first incident laser light is reflected by the first reflective device to form the first reflected laser light;
the second incident laser light is reflected by the second reflective device to form the second reflected laser light;
the controller is used to determine a height of the chuck device and determine whether a center point of a reflected light spot formed by the first reflected laser light is offset from a center point of an incident light spot formed by the first incident laser light; and the controller is used to determine a height of the carrying platform and determine whether a center point of a reflected light spot formed by the second reflected laser light is offset from a center point of an incident light spot formed by the second incident laser light.

10. The level correction system of claim 9, wherein:
if the center point of the reflected light spot of the first reflected light is offset from the center point of the incident light spot of the first incident light, the controller adjusts the first adjustment device to adjust a level of the chuck seat; and
if the center point of the reflected light spot of the second reflected light is offset from the center point of the incident light spot of the second incident light, the controller adjusts the second adjustment device to adjust a level of the carrying table.

11. The level correction system of claim 10, wherein:
the carrying table is located above the chuck device;
the carrying table defines a through hole;
the second reflective device is arranged at the through hole; and
the first reflective device is arranged below the through hole.

12. The level correction system of claim 11, wherein:
there are at least three second adjustment devices arranged at a bottom of the carrying platform.

13. The level correction system of claim 12, wherein:
the incident light spots of the first incident light and the second incident light and the reflected light spots of the first reflected light and the second reflected light are cross-shaped.

14. The level correction system of claim 13, further comprising a display device electrically coupled to the controller, wherein:
the display device is configured to display the incident light spots of the first incident light and the second incident light and the reflected light spots of the first reflected light and the second reflected light.

15. The level correction system of claim 9, wherein the first adjustment device and the second adjustment device are both adjusting nuts.

* * * * *